INVENTOR
CARL J. KUGLER
BY
Busser, Smith & Harding
ATTORNEYS

INVENTOR
CARL J. KUGLER
BY
Busser, Smith & Harding
ATTORNEYS

Feb. 9, 1971 C. J. KUGLER 3,562,762
BATTERY OPERATED PRINTOUT
Filed Aug. 23, 1968 3 Sheets-Sheet 3
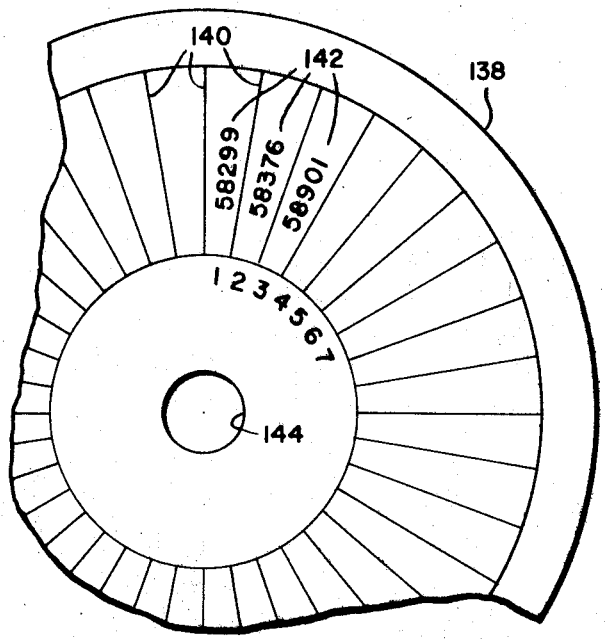
FIG. 6.
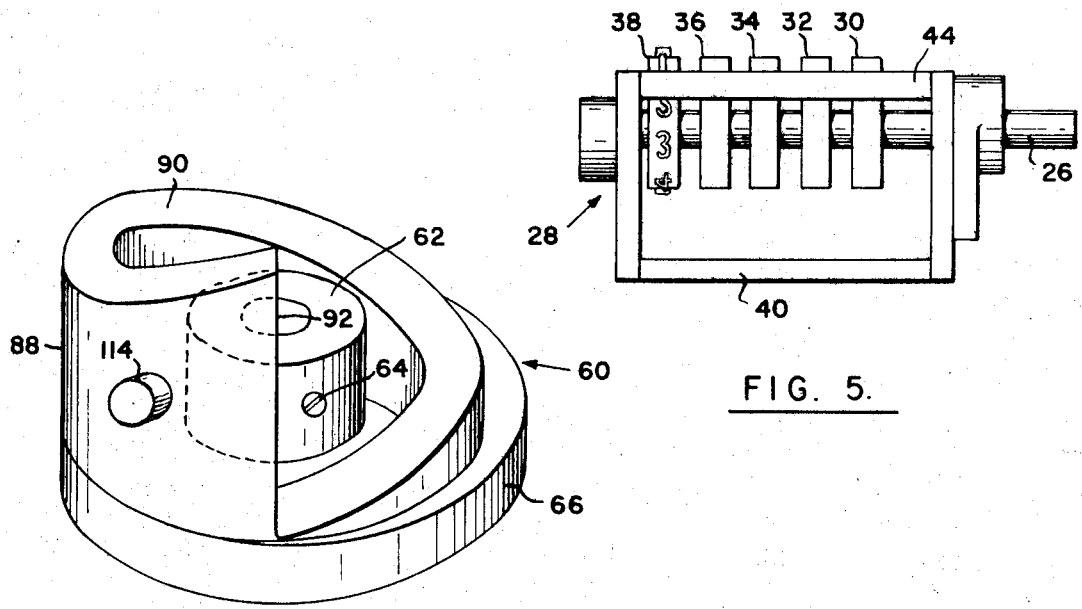
FIG. 4.
FIG. 5.
INVENTOR
CARL J. KUGLER
BY
Bussey, Smith & Harding
ATTORNEYS

United States Patent Office 3,562,762
Patented Feb. 9, 1971

3,562,762
BATTERY OPERATED PRINTOUT
Carl J. Kugler, Philadelphia, Pa., assignor to American Meter Company, Philadelphia, Pa., a corporation of Delaware
Filed Aug. 23, 1968, Ser. No. 754,778
Int. Cl. G01d 9/16
U.S. Cl. 346—94
13 Claims

ABSTRACT OF THE DISCLOSURE

A printing counter for use in conjunction with gasmeters and the like is arranged to print indications on a circular chart periodically by the use of a spring-loaded hammer which is released by a motor-driven cam. The motor also controls indexing of the chart, and is controlled, in turn, by a clock-operated switch. Power is supplied by a battery.

BACKGROUND OF THE INVENTION

This invention relates to printout devices, and particularly to a device for use in conjunction with a volumetric metering apparatus of the type disclosed in my copending application Ser. No. 663,351, filed Aug. 25, 1967. The apparatus disclosed in that application is a temperature and pressure compensated volumetric gasmeter. It is provided with a counter giving visual indications of gas volume. It is also provided with a shaft, coupled to the counter, which may be used to drive an optional printing counter. A suitable printing counter is disclosed in this application.

The function of a printing counter for use in conjunction with a gasmeter is to record counter indications periodically, in order to provide the reader with a history of gas consumption. For example, a printed record, either of the daily or hourly volume of gas that passes through the meter might be desired.

Among the various difficulties which have been encountered in the manufacture and use of known printing counters is the high energy requirement for their operation, which prohibits use of batteries as sources of operating power.

It should also be observed that, because of the dangers inherent in the use of high voltages, line-powered printout devices cannot be used safely in a medium of inflammable gas.

Another difficulty which is often encountered in the operation of printing counters is the possibility of the occurrence of a printing operation while one or more of the counter wheels are undergoing a movement. Ordinarily, complex interlocks are necessary in order to avoid misprints caused by misalignment of counter wheels.

SUMMARY OF THE INVENTION

In accordance with this invention, a single, low-voltage battery is used as a source of operating power. A continuously operating clock motor, which requires very little power, operates a switch at the end of each interval after which printing is to take place. This switch causes a second motor to rotate through a single revolution. The motor drives a pair of cams, the first of which releases a spring-loaded hammer near the beginning of its rotation. This hammer strikes a chart made from pressure-sensitive paper, and forces it against the wheels of the counter, causing printing of the counter indication on the chart.

The second cam then operates a ratchet mechanism, which moves the chart to a new position in preparation for a subsequent printing operation.

A pin, mounted on the shaft of the counter, opens a switch whenever the counter wheels are rotating. This switch delays the printing operation until the counter wheels are in position.

Provision is made so that a reader can effect printing manually when changing charts.

The motor, which drives the pair of cams, rotates the cams through a single revolution, only once every hour, or once every day depending on the type of operation desired. The revolution of the cams takes place during a period comprising about fifteen seconds. It will be seen that the energy required for such operation can be supplied easily by a small battery.

The object of this invention is to provide a printout device, which is extremely simple and reliable, and which requires so little energy for its operation that it can be powered by a small battery for a very long period of time.

BRIEF DESCRIPTION OF THE DRAWINGS

FIG. 4 is a perspective view of printing and chart-indexing cams;

FIG. 5 is a side elevation of the counter; and

FIG. 6 is a partially cut-away elevation of a chart.

DESCRIPTION OF THE PREFERRED EMBODIMENT

Figure 1:
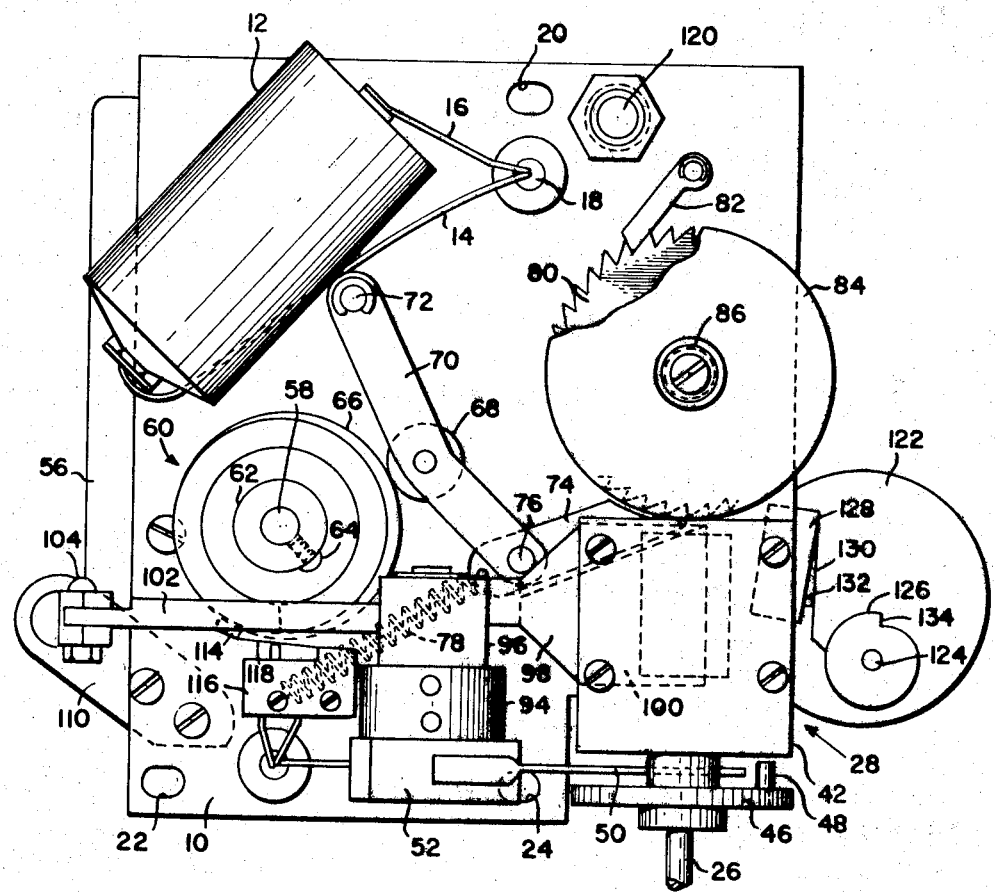
FIG. 1 is an elevation of the mechanical portions of the printout device.
Figure 2:
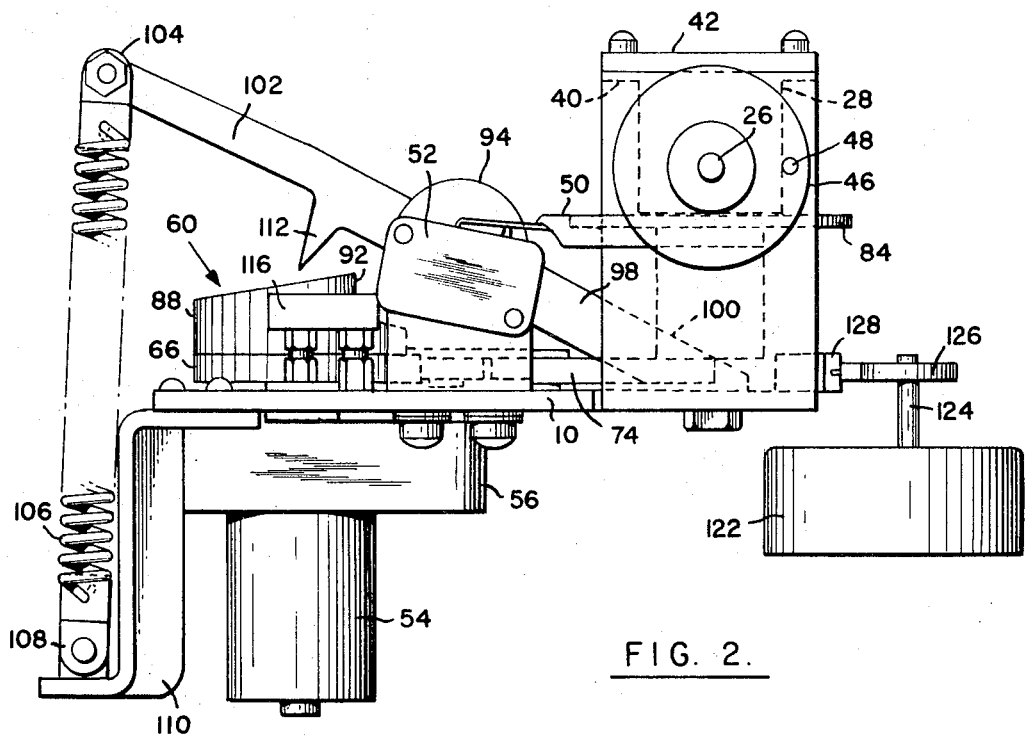
FIG. 2 is a bottom plan view of the apparatus shown in FIG. 1.

FIGS. 1 and 2 illustrate the arrangement of mechanical parts in accordance with the invention.

A plate 10 is provided for the mounting of parts. A battery 12, which may be an ordinary flashlight cell, but which is desirably an alkaline battery, is mounted on plate 10 in a suitable battery holder (not shown). Battery 12 delivers 1.5 volts. Its leads 14 and 16 pass through an opening 18 in the plate.

Holes for mounting holes for the plate are provided at 20, 22 and 24.

A shaft 26, which, in operation, will be coupled to the output of a metering apparatus, is arranged to drive a mechanical counter 28. The counter 28 is illustrated more clearly in FIG. 5. Its shaft 26 drives a units wheel 30 in a conventional manner, and wheel 30, in turn, drives tens wheel 32 and subsequent wheels 34, 36 and 38, which represent hundreds, thousands and ten thousands respectively. Each of the wheels has embossed on it the digits zero through nine. The counter is mounted in a framework, which includes plate 40, by which the counter is fastened to a mounting bracket 42. The embossed digits, which extend beyond member 44 of the counter frame are the ones which are printed.

Also mounted on shaft 26 is a disc 46, which is provided with a pin 48 near its periphery, and parallel to shaft 26. Pin 48 is arranged to engage actuating arm 50 of microswitch 52 when the counter wheels are in motion, and therefore not in the perfect alignment with each other which is necessary for proper printing.

The counter wheels are in motion through about 36° of the rotation of shaft 26. Microswitch 52 is opened through these 36°, and, as will be seen from the subsequent description of the electrical circuitry, microswitch 52 temporarily disables the printing elements until the counter wheels are in proper alignment. It will be apparent that the arrangement just described avoids the possibility of printing seriously erroneous readings which might result if printing took place while higher order digits were changing.

A D.C. motor 54, which operates on the battery voltage is mounted behind plate 10. Reduction gearing is provided within casing 56, and an output shaft 58 extends through an opening in plate 10.

A cam, generally indicated at 60 is illustrated more clearly in FIG. 4. A central boss 62 receives shaft 58 in its central opening. A set screw 64 secures cam 60 to shaft 58.

Cam 60, in effect, comprises three cams, each having a different function. A first cam 66 comprises a lobe, the radius of which varies. Referring back to FIGS. 1 and 2, it will be apparent that cam 66 cooperates with a roller 68, which is rotatably mounted on a lever arm 70 pivoted at 72. A pawl 74 is pivotally mounted at 76 at the end of arm 70, and is urged in a direction such that roller 68 is held in engagement with cam 66 by spring 78. Pawl 74 cooperates with teeth on a ratchet wheel 80. An additional pawl 82 cooperates with the teeth of wheel 80 to prevent movement of the wheel in a reverse direction while pawl 74 is operating. Ratchet wheel 80 drives a circular plate 84, to which a chart is fastened by a screw cap (not shown) threaded on threads 86.

For each rotation of shaft 58, the mechanism just described causes circular plate 84 to be moved one step in a counterclockwise direction.

Returning to FIG. 4, cam 60 also includes a second cam 88, which is cylindrical, and which has a face 90 having a gradual axial rise in the counterclockwise direction followed by a sharp drop indicated at 92.

Again referring to FIGS. 1 and 2, a mounting 94 houses a bearing (not shown), which supports a shaft extending downwardly from the pivot 96 of a printing hammer assembly 98. The hammer itself is indicated at 100. The width of its face is slightly greater than the distance between the first and last wheels of the counter.

On the opposite side of the pivot 96, there is provided an arm 102, the end 104 of which is urged downwardly by a spring 106, the opposite end of which is attached to a mounting 108 supported from plate 10 by bracket 110.

Arm 102 is provided with a depending cam rider 112, which rides on surface 90 of cam 88. Counterclockwise rotation of cam 88 causes spring 106 to be extended, storing energy for subsequent movement of hammer 100 against the recording chart. When rider 112 passes drop 92, spring 106 causes hammer 100 to effect a printing operation.

Mounted on the outer wall of cam 88 is a radially extending pin 114. Referring to FIGS. 1 and 2, a microswitch 116 is shown. Its actuating arm 118 is arranged to be engaged by pin 114 throughout a few degrees of the rotation of shaft 58. The subsequent description of the electrical circuitry will explain that the normal stationary position of cam 60 is as shown in FIG. 1, in which pin 114 is illustrated in its position following its clearing of actuating arm 118.

Figure 3:
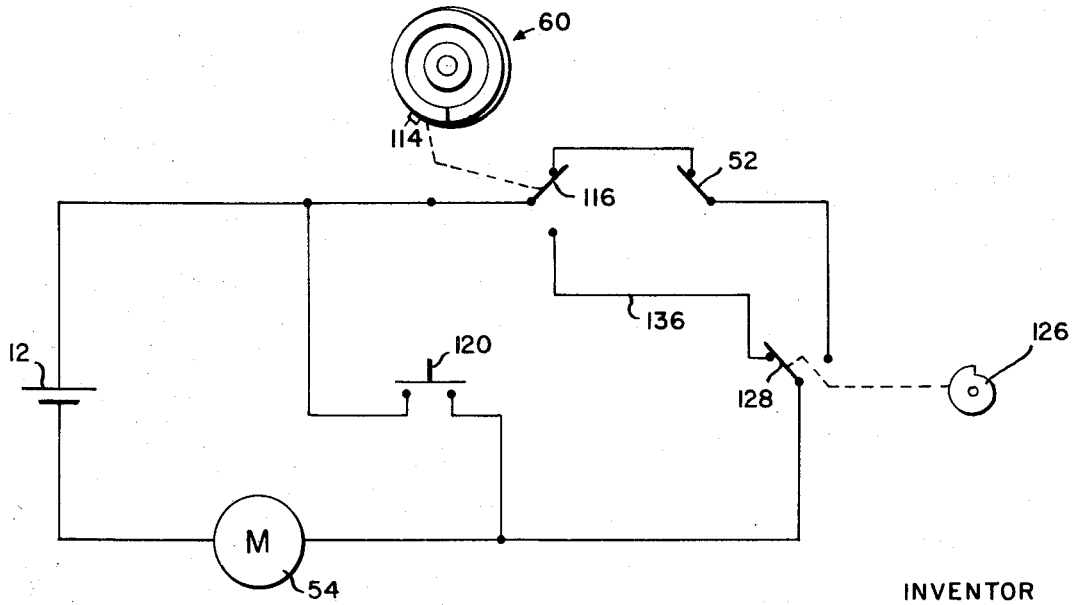
FIG. 3 is a schematic diagram of the electrical circuitry of the printout device.

A manually operable push-button is shown in FIGS. 1 and 3 at 120.

FIGS. 1 and 2 show a clock motor 122 having a shaft 124, which drives a cam 126 in a counterclockwise direction. A microswitch 128 has an actuating arm 130, which normally holds button 132 down except for a period of time following the time at which the end of arm 130 falls off drop 134 of the cam. Motor 122 operates continuously, and may be powered by current from battery 12.

Referring to FIG. 3, the various electrical connections having significance in connection with the operation of the mechanism described above are shown. Reference numerals of the various elements in FIG. 3 correspond to numerals referring to the corresponding elements in FIGS. 1 and 2.

Battery 12 is connected through manually operable switch 120 to motor 54. A second path for current from battery 12 to motor 54 can be traced through switch 116, switch 52 and switch 128. A third path can be traced through switch 116, line 136 and switch 128.

FIG. 6 shows a chart 138. The chart is desirably made from specially sensitized paper of a commonly available type, which darkens at points to which pressure is applied. The chart is imprinted with radial lines 140 defining spaces in which numbers will be printed by the counter. Although other configurations can be used, the chart is desirably provided with thirty-six such spaces, each labeled by a printed number. Printed counter indications are shown at 142. A hole is provided at 144, so that the chart can be fitted over threads 86. The portion of the chart on which printing is to take place passes just underneath the wheels of the counter.

The operation of the apparatus can be described as follows, with particular reference to the electrical circuit of FIG. 3.

Cam 60 is normally in a position such that pin 114 has cleared the actuating arm of switch 116. Switch 116 is shown in its normal position. Switch 52 is permitted to be closed by pin 48 on wheel 46, indicating that the counter wheels are in line and ready to print. Switch 128 is held by the clock cam 126 in the position shown. Push-button 120 is normally open. The normal printing operation takes place as follows:

When cam 126, which is rotating in a counterclockwise direction, permits switch 128 to change its state, current from the battery is conducted through switch 116, switch 52 and switch 128. Motor 54 begins to rotate cam 60. Rider 112 (FIG. 2) almost immediately falls, and a printing operation takes place.

Motor 54 continues to rotate cam 60 until pin 114, operating switch 116 opens the energizing circuit. Switch 116 is now connected to line 136. The operation described so far might take place in an interval of, for example, fifteen seconds.

Cam 126, which continues to rotate in a counterclockwise direction, eventually returns switch 128 to the position indicated, whereupon motor 54 is again energized.

Motor 54 rotates cam 60 through a few degrees until pin 114 clears the actuating arm of switch 116, permitting switch 116 to return to the position in which it is shown. The apparatus is now ready to begin another printing operation when cam 126 completes its revolution.

An important characteristic of the operation of this apparatus is that energy is supplied to motor 54 during two separate intervals for each printing cycle. By operating in this manner, the apparatus is able to prevent cam 60 from rotating more than once for each printing cycle, while it permits the clock-operated cam to rotate at its necessarily very slow rate. Switches 116 and 128 are returned to their initial position at the end of each printing cycle.

If, when switch 128 operates at the initiation of a printing operation, the counter wheels are in motion, switch 52 will be opened. The contour of cam 126 is such that switch 128 remains connected to switch 52 for sufficient length of time to permit switch 52 to close prior to the return of switch 128 to its normal position. When switch 52 closes, the printing cycle takes place as described above. The fact that switch 128 remains connected to switch 52 for a long time prevents a printing cycle from being missed entirely when the circuit is disabled because of movement of the counter wheels.

When a reader installs a new chart, he might wish to cause a printing of the number on the counter on the used chart before he removes it, and on the new chart as soon as he installs it. He can do this by depressing push-button 120, and holding it until pin 114 operates switch 116. He must then release push-button 120. Motor 54 will then continue to run until pin 114 clears the arm of switch 116.

From the operation just described, it will be seen that the duty cycle of the printout device, which involves two short intervals of time during which the motor is in operation, is such that low-voltage battery operation is feasible.

If shorter printing intervals are desired, cam 124 can be easily replaced by one having multiple lobes.

I claim:

1. In combination, a counter, having a plurality of printing wheels subject to unpredictable phases of stationary and changing conditions, means for effecting substantially instantaneous printing by said wheels, a clock mechanism controlling the last means for effecting printing at predetermined uniformly spaced times, and means preventing more than one printing operation at any one of said predetermined times, in which said means for effecting printing comprises a pair of energizing terminals for receiving electrical current for operating a motor, a motor, and a printing element operable by said motor, and in which said means for preventing more than one printing operation includes a first switch operated by said clock mechanism and a second switch, means responsive to said motor for causing said second switch to change its position at least twice for each printing operation, each of said switches having three terminals and means connecting a first of said terminals alternately to one or the other of the second and third of said terminals, means connecting the second terminals of said switches together, means connecting the third terminals of said switches together, and means connecting said motor through said switches to said energizing terminals to establish paths through said switches for the energization of said motor in two of the four combinations of switch positions.

2. The combination according to claim 1 including a third switch in an energizing circuit of said motor, said third switch being responsive to the condition of said printing wheels for breakng at least one of said paths when any of said wheels is in a changing condition.

3. In combination, a counter, having a plurality of printing wheels subject to unpredictable phases of stationary and changing conditions, means for effecting substantially instantaneous printing by said wheels, a clock mechanism controlling the last means for effecting printing at predetermined uniformly spaced times, and means preventing more than one printing operation at any one of said predetermined times, in which said means for effecting printing comprises a pair of energizing terminals for receiving electrical current for operating a motor, a motor, a cam operable by said motor, and a printing element operable by said cam, and in which said means for preventing more than one printing operation includes a first switch operated by said clock mechanism and a second switch, means responsive to said motor for causing said second switch to change its position at least twice for each printing operation, each of said switches having three terminals and means connecting a first of said terminals alternately to one or the other of the second and third of said terminals, means connecting the second terminals of said switches together, means connecting the third terminals of said switches together, and means connecting said motor through said switches to said energizing terminals to establish paths through said switches for the energization of said motor in two of the four combinations of switch positions.

4. The combination according to claim 3 including a third switch in an energizing circuit of said motor, said third switch being responsive to the condition of said printing wheels for breaking at least one of said paths when any of said wheels is in a changing condition.

5. In combination, a counter, having a plurality of printing wheels subject to unpredictable phases of stationary and changing conditions, means for effecting substantially instantaneous printing by said wheels, a clock mechanism controlling the last means for effecting printing at predetermined uniformly spaced times, and means preventing more than one printing operation at any one of said predetermined times, in which said means for effecting printing comprises a pair of energizing terminals for receiving electrical current for operating a motor, a motor, and a printing element operable by said motor, and in which said means for preventing more than one printing operation includes a first switch operated by said clock mechanism and a second switch operated by said motor, each of said switches having three terminals and means connecting a first of said terminals alternately to one or the other of the second and third of said terminals, means connecting the second terminals of said switches together, means connecting the third terminals of said switches together, and means connecting said motor through said switches to said energizing terminals to establish paths through said switches for the energization of said motor in two of the four combinations of said position.

6. The combination according to claim 5 including a third switch in an energizing circuit of said motor, said third switch being responsive to the condition of said printing wheels for breaking at least one of said paths when any of said wheels is in a changing condition.

7. Printout apparatus comprising a motor, printing means operable by said motor, a pair of energizing terminals, and means for controlling delivery of electric current to said motor to operate said motor, said means for controlling delivery of current comprising first and second switches, each having three terminals, each of said switches including means for connecting a first of its terminals to the second or third of its terminals alternatively, a clock controlling operation of the first switch, means operable by said motor for causing said second switch to change its position at least twice for each printing cycle, means connecting the second terminals of said switches together, means connecting the third terminals of said switches together, means connecting said motor, through said switches, to said energizing terminals to establish paths through said switches for the energization of said motor in two of the four combinations of switch positions.

8. Printout apparatus according to claim 7 including means for carrying a chart on which said printing means prints, and means operable by said motor for advancing said chart carrying means prior to each printing operation.

9. Printout apparatus according to claim 7 including a bypassing switch and connecting means for establishing a closed circuit from one of said energizing terminals, through said motor, and through said bypassing switch, to the other of said energizing terminals when said bypassing switch is closed to operate said motor when said first and second switches are in the other two combinations of switch positions.

10. Printout apparatus comprising printing means, an electric motor, a cam operable by said motor, energy storage means, means operable by said cam for storing energy in said storage means, said cam including means for releasing said energy, means delivering said energy, when released, to operate said printing means, a pair of energizing terminals, and means for controlling delivery of electric current from said terminals to said motor to operate said motor, said means for controlling delivery of current comprising first and second switches, each having three terminals, each of said switches including means for connecting a first of its terminals to the second or third of its terminals alternatively, a clock controlling operation of the first switch, means operable by said motor for causing said second switch to change its position at least twice for each printing cycle, means connecting the second terminals of said switches together, means connecting the third terminals of said switches together, means connecting said motor, through said switches, to said energizing terminals to establish paths through said switches for the energization of said motor in two of the four combinations of switch positions.

11. Printout apparatus according to claim 10 in which said printing means includes a counter having wheels with embossed numerals, and in which said means delivering said energy includes a hammer arranged to force paper against said wheels.

12. The combination according to claim 11 including a third switch in the energizing circuit of said motor, said third switch being responsive to the condition of said counter for breaking the energizing circuit of said motor when any of said wheels is in a changing condition.

13. Printout apparatus comprising a cyclically-operating printing means, a motor driving said printing means, timing means for initiating operation of said motor at times spaced by uniform intervals greatly exceeding the duration of a cycle of the printing means, first means controlled by said timing means to energize said motor, second means operable by the motor to terminate the motor operation at the end of a cycle of the printing means irrespective of the motor operation-initiating condition of said first means, and means interconnected with the first and second means and operable by a subsequent operation of the first means to reenergize the motor to initiate a subsequent cycle of the printing means despite the motor operation-terminating condition of said second means.

References Cited
UNITED STATES PATENTS

| | | | |
|---|---|---|---|
| 2,842,052 | 7/1958 | Coonradt | 101—287 |
| 2,957,743 | 10/1960 | Terry | 346—17 |
| 2,518,691 | 8/1950 | Horan et al. | 346—14 |
| 3,468,249 | 9/1969 | Tseo | 101—235 |

JOSEPH W. HARTARY, Primary Examiner

U.S. Cl. X.R.

101—287; 346—79